US010936897B2

(12) United States Patent
Vig et al.

(10) Patent No.: US 10,936,897 B2
(45) Date of Patent: Mar. 2, 2021

(54) METHOD AND SYSTEM FOR INFORMATION EXTRACTION FROM DOCUMENT IMAGES USING CONVERSATIONAL INTERFACE AND DATABASE QUERYING

(71) Applicant: Tata Consultancy Services Limited, Mumbai (IN)

(72) Inventors: Lovekesh Vig, Gurgaon (IN); Gautam Shroff, Gurgaon (IN); Arindam Chowdhury, Gurgaon (IN); Rohit Rahul, Gurgaon (IN); Gunjan Sehgal, Gurgaon (IN); Vishwanath Doreswamy, Gurgaon (IN); Monika Sharma, Gurgaon (IN); Ashwin Srinivasan, Sancoale (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 74 days.

(21) Appl. No.: 16/353,570

(22) Filed: Mar. 14, 2019

(65) Prior Publication Data
US 2020/0175304 A1 Jun. 4, 2020

(30) Foreign Application Priority Data
Nov. 30, 2018 (IN) .............. 201821045427

(51) Int. Cl.
*G06F 16/2452* (2019.01)
*G06F 16/2455* (2019.01)
(Continued)

(52) U.S. Cl.
CPC .......... *G06K 9/46* (2013.01); *G06F 16/2455* (2019.01); *G06F 16/24522* (2019.01);
(Continued)

(58) Field of Classification Search
CPC .............. G06F 16/313; G06F 16/3344; G06F 16/3332; G06F 16/93; G06F 16/245;
(Continued)

(56) References Cited

U.S. PATENT DOCUMENTS 6,778,979 B2 8/2004 Grefenstette et al.
7,398,201 B2 7/2008 Marchisio et al.
(Continued)

FOREIGN PATENT DOCUMENTS

CN 105122243 12/2015

*Primary Examiner* — Santiago Garcia
(74) *Attorney, Agent, or Firm* — Finnegan, Henderson, Farabow, Garrett & Dunner, LLP

(57) ABSTRACT

Various methods are using SQL based data extraction for extracting relevant information from images. These are rule based methods of generating SQL-Query from NL, if any new English sentences are to be handled then manual intervention is required. Further becomes difficult for non-technical user. A system and method for extracting relevant from the images using a conversational interface and database querying have been provided. The system eliminates noisy effects, identifying the type of documents and detect various entities for diagrams. Further a schema is designed which allows an easy to understand abstraction of the entities detected by the deep vision models and the relationships between them. Relevant information and fields can then be extracted from the document by writing SQL queries on top of the relationship tables. A natural language based interface is added so that a non-technical user, specifying the queries in natural language, can fetch the information effortlessly.

14 Claims, 8 Drawing Sheets

(51) Int. Cl.
  *G06F 16/28* (2019.01)
  *G06F 40/295* (2020.01)
  *G06F 40/30* (2020.01)
  *G06K 9/00* (2006.01)
  *G06K 9/46* (2006.01)
  *G06K 9/62* (2006.01)
  *G06N 3/08* (2006.01)
  *G06T 5/00* (2006.01)

(52) U.S. Cl.
  CPC ......... *G06F 16/284* (2019.01); *G06F 40/295* (2020.01); *G06F 40/30* (2020.01); *G06K 9/00442* (2013.01); *G06K 9/6262* (2013.01); *G06N 3/08* (2013.01); *G06T 5/002* (2013.01); *G06K 2209/01* (2013.01)

(58) Field of Classification Search
  CPC ...... G06F 40/10; G06F 40/253; G06F 16/316; G06F 16/338; G06F 16/3346; G06F 16/332; G06F 16/00; G06F 40/169; G06F 16/43; G06F 16/434; G06F 16/9032; G06F 3/005; G06F 16/58; G06F 16/41; G06F 40/14; G06F 40/263; G06F 40/58; G06N 5/025; G06N 20/00; G06K 9/00463; G06K 9/38; G06K 9/3233; G06K 9/00281; G06K 9/00469; G06K 9/6256; G06K 2209/01; G06K 9/00442; G06K 9/4671; G06K 9/00671; G06T 2207/30176; G06T 7/00; G06T 7/70; H04N 2201/3266; H04N 1/00116; H04N 2201/0081; H04N 1/0036; Y10S 707/99934; G01B 11/00; G06Q 40/12; G07D 11/30; G07D 7/004; G09G 5/00
  USPC ............... 382/173, 229, 135; 345/441, 589; 707/722, 728, 730, 738
  See application file for complete search history.

(56) References Cited

U.S. PATENT DOCUMENTS

| | | | |
|---|---|---|---|
| 7,461,077 B1 | 12/2008 | Greenwood | |
| 8,761,513 B1* | 6/2014 | Rogowski | G09G 5/246 382/181 |
| 2004/0205448 A1* | 10/2004 | Grefenstette | G06F 16/9535 715/230 |
| 2005/0043940 A1 | 2/2005 | Elder | |
| 2005/0144189 A1* | 6/2005 | Edwards | G06F 16/185 |
| 2006/0012677 A1* | 1/2006 | Neven, Sr. | G06K 9/228 348/61 |
| 2007/0050419 A1* | 3/2007 | Weyl | G06F 16/434 |
| 2007/0172106 A1* | 7/2007 | Paraskevakos | G06K 9/6857 382/135 |
| 2010/0061634 A1* | 3/2010 | Howie | G06F 16/313 382/176 |
| 2011/0035662 A1* | 2/2011 | King | G06F 40/169 715/273 |
| 2011/0145068 A1* | 6/2011 | King | G06F 40/169 705/14.55 |
| 2011/0153653 A1* | 6/2011 | King | G06F 16/5846 707/769 |
| 2012/0069131 A1* | 3/2012 | Abelow | G06Q 10/067 348/14.01 |
| 2012/0128249 A1* | 5/2012 | Panjwani | G06K 9/00469 382/177 |
| 2013/0011062 A1* | 1/2013 | Conwell | G06K 9/0063 382/173 |
| 2013/0106894 A1* | 5/2013 | Davis | G06F 16/436 345/589 |
| 2013/0138428 A1* | 5/2013 | Chandramouli | G06F 40/40 704/9 |
| 2015/0324390 A1* | 11/2015 | Macciola | G06K 9/3275 707/769 |
| 2016/0012044 A1* | 1/2016 | Franceschini | G06F 16/951 707/722 |
| 2016/0012057 A1* | 1/2016 | Franceschini | G06F 16/313 707/730 |
| 2016/0012058 A1* | 1/2016 | Franceschini | G06F 16/951 707/728 |
| 2016/0012122 A1* | 1/2016 | Franceschini | G06F 16/3334 707/739 |
| 2018/0068019 A1* | 3/2018 | Novikoff | G06F 16/738 |
| 2019/0279356 A1* | 9/2019 | Kuwertz | G06N 3/0472 |
| 2019/0304136 A1* | 10/2019 | Fukuda | G06K 9/00604 |
| 2020/0074674 A1* | 3/2020 | Guo | G06T 5/008 |

* cited by examiner

| Drawer | | | Drawee |
|---|---|---|---|
| XYZ COMPOSITE LIMTED | | | ABCD PRIVATE LIMTED |
| GILARSHALA, SREEPUR | | | P. BOX 254 |
| GAZIPUR, BANGLADESH | | | 34568, BILLINGSTAD |
| | | | NORWAY |
| BANGLADESH | | | NORWAY |

| Documents attached | ORIGINAL | COPIES |
|---|---|---|
| DRAFT | 2 | 0 |
| COMM INV | 2 | 0 |
| PACK LIST | 2 | 3 |
| B/L | 3 | 0 |
| AWB | 0 | 2 |
| GSP | 1 | 0 |
| INSP CERT | 0 | 0 |
| BENE CERT | 0 | 0 |
| | 0 | 0 |
| | 0 | 0 |

Collection instruction

Collection instruction
Release document against payment only
Advise us by SWIFT in case of non-acceptance / Non payment stating the reasons and the document at your counter till our further instructions
Remit the proceed to our Nostro account number: 98765432109B With STANDARD CHARTERED BANK, SCBNY NY 10010-3603
USA, SWIFT: XABCLU33

FIG. 7

METHOD AND SYSTEM FOR INFORMATION EXTRACTION FROM DOCUMENT IMAGES USING CONVERSATIONAL INTERFACE AND DATABASE QUERYING

PRIORITY CLAIM

This U.S. patent application claims priority under 35 U.S.C. § 119 to: India Application No. 201821045427, filed on Nov. 30, 2018. The entire contents of the aforementioned application are incorporated herein by reference.

TECHNICAL FIELD

The embodiments herein generally relates to the field of data extraction from images. More particularly, but not specifically, the invention provides an end-to-end system and method for extracting relevant information from a document image using conversational interface and database querying.

BACKGROUND

Recent advancements in the area of Computer Vision with state-of-art neural networks has given a boost to Optical Character Recognition (OCR) accuracies. However, extracting characters/text alone is often insufficient as documents also have a visual structure that is not captured by OCR. Extracting information from tables, charts, footnotes, boxes, headings and retrieving the corresponding structured representation for the document remains a challenge and finds application in a large number of real-world use cases.

While OCR accuracies have significantly improved, thanks to advancement in deep learning, these alone are insufficient for effective extraction of information from scanned documents. Most documents have a rich visual structure in the form of tables, text-boxes, blocks, charts and graphs. The visual relationships between the different entities present in an image are critical to understanding and reasoning over the information present prior to extraction. Also, very often incorporation of domain knowledge or business rules can often boost the extraction performance and enable validation and correction of extracted data.

Extracting text from images have been an active field of research for several decades. Interpreting documents with a relatively simple textual layout and good quality scans is now reasonably straightforward thanks to these advancements. However, when dealing with documents following several different templates with diverse visual layouts, retrieving semantically accurate information can be very challenging. There has been extensive line of work towards solving this problem.

A research group has developed an information extraction system wherein a document instance is matched with a set of pre-stored models which define categories of documents. The extracted document text is compared against a pre-compiled list of keywords and their spelling variants. The results are matched with each document in a database of word models and their logical relationships. Another method requires the user to build a conceptual model of the document, which is then used to match, interpret and extract contents from the document. The work places more emphasis on the classification and organization of the documents rather than extraction of key fields. These prior arts build an attribute relational graph based representation of the document to capture relationships between entities in an image, however their system relies on considerable expertise from the user to create suitable template document models.

The current methods for information extraction require programming at the level of pixel coordinates, and are not abstract enough for quick deployment by novice users. Further, majority existing methods use hand-crafted rule based methods of generating SQL-Query from NL. If any new English sentences are to be handled then manual intervention is required like indexing the new data and updating the dictionary, meta-data etc.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, an embodiment herein provides a system for extracting relevant information from an image. The system comprises an input module, memory and a processor. The input module provides the image as an input image. The processor further comprises a noise removing module, a document identifier, an optical character recognition engine, a schema designing module, a storing module, a conversational interface, a conversion module and a database querying module. The noise removing module performs a de-noising method on the input image to remove noise from the input image. The document identifier identifies a type of document, wherein the type is either a printed text or a handwritten text. The OCR engine performs an optical character recognition (OCR) on the image depending on the type of identified document to detect a set of textual entities. The schema designing module designs a schema to establish a relation between the set of textual entities. The storing module stores the detected set of textual entities and the schema in a relational database. The conversational interface provides natural language queries to extract relevant information by a user. The conversion module converts the natural language queries in to an SQL query. The database querying module provides the SQL query to the relational database to extract the relevant information from the relational database.

In another aspect the embodiment here provides a method for extracting relevant information from an image. Initially, the image is obtained as an input image. In the next step, a de-noising method is performed on the input image to remove noise from the input image. Further, a document identifier is ran to identify a type of document, wherein the type is either a printed text or a handwritten text. In the next step, an optical character recognition (OCR) is performed on the image depending on the type of identified document to detect a set of textual entities. Then a schema is designed to establish a relation between the set of textual entities. The detected set of textual entities and the schema are then stored in a relational database. In the next step, natural language queries are provided to extract relevant information by a user using a conversational interface. The natural language queries are then converted in to an SQL query. And finally, the SQL query is provided to the relational database to extract the relevant information from the relational database.

In yet another embodiment, there is provided one or more non-transitory machine readable information storage mediums comprising one or more instructions which when executed by one or more hardware processors causes the one or more hardware processors to perform a method for designing one or more unified architecture models for architecting digital products and digital services, the method comprising a processor implemented steps of obtaining the image as an input image, performing a de-noising method on the input image to remove noise from the input image, running a document identifier to identify a type of document, wherein the type is either a printed text or a handwritten text, performing an optical character recognition (OCR) on the image depending on the type of identified document to detect a set of textual entities, designing a schema to establish a relation between the set of textual entities, storing the detected set of textual entities and the schema in a relational database, providing natural language queries by a user to extract relevant information using a conversational interface and converting the natural language queries in to an SQL query, and providing the SQL query to the relational database to extract the relevant information from the relational database.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 7 shows an example of the sample bank document to be used for information extraction according to an embodiment of the disclosure.

DETAILED DESCRIPTION

Figure 1:
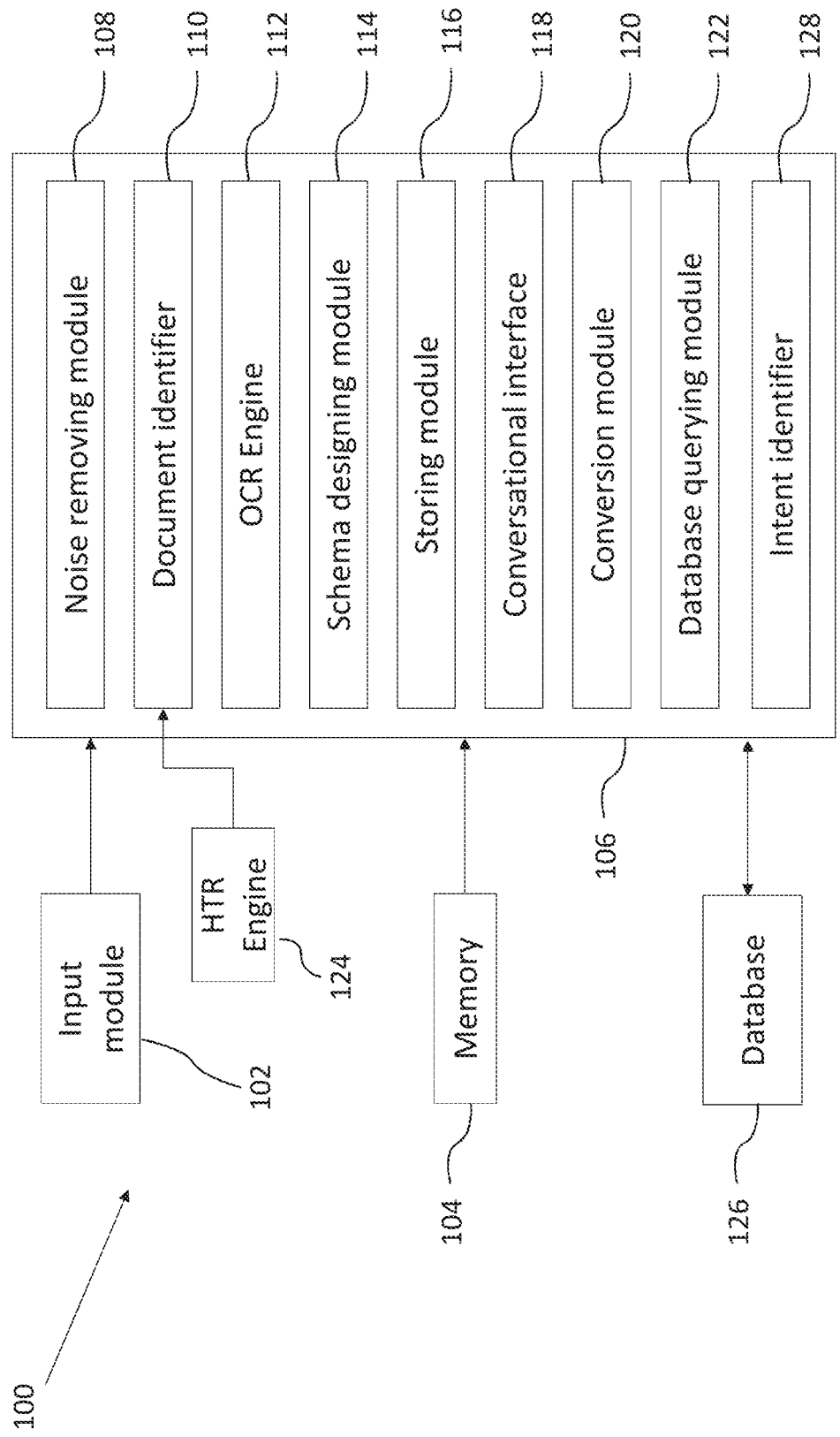
FIG. 1 illustrates a block diagram of a system for extracting relevant information from an image using conversational interface and database querying according to an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Referring now to the drawings, and more particularly to FIG. 1 through FIG. 7, where similar reference characters denote corresponding features consistently throughout the figures, there are shown preferred embodiments and these embodiments are described in the context of the following exemplary system and/or method.

According to an embodiment of the disclosure, a system 100 for extracting relevant information from an image using conversational interface and database querying is shown in the block diagram of FIG. 1. The system 100 makes use of the spatial relationships between the different visual entities present in the image into relational tables that can be queried via SQL or natural language queries. It does so by making use of the latest deep learning models for visual entity extraction, and by leveraging the recent advancements that deep learning has made in NLP and program synthesis.

Figure 2:
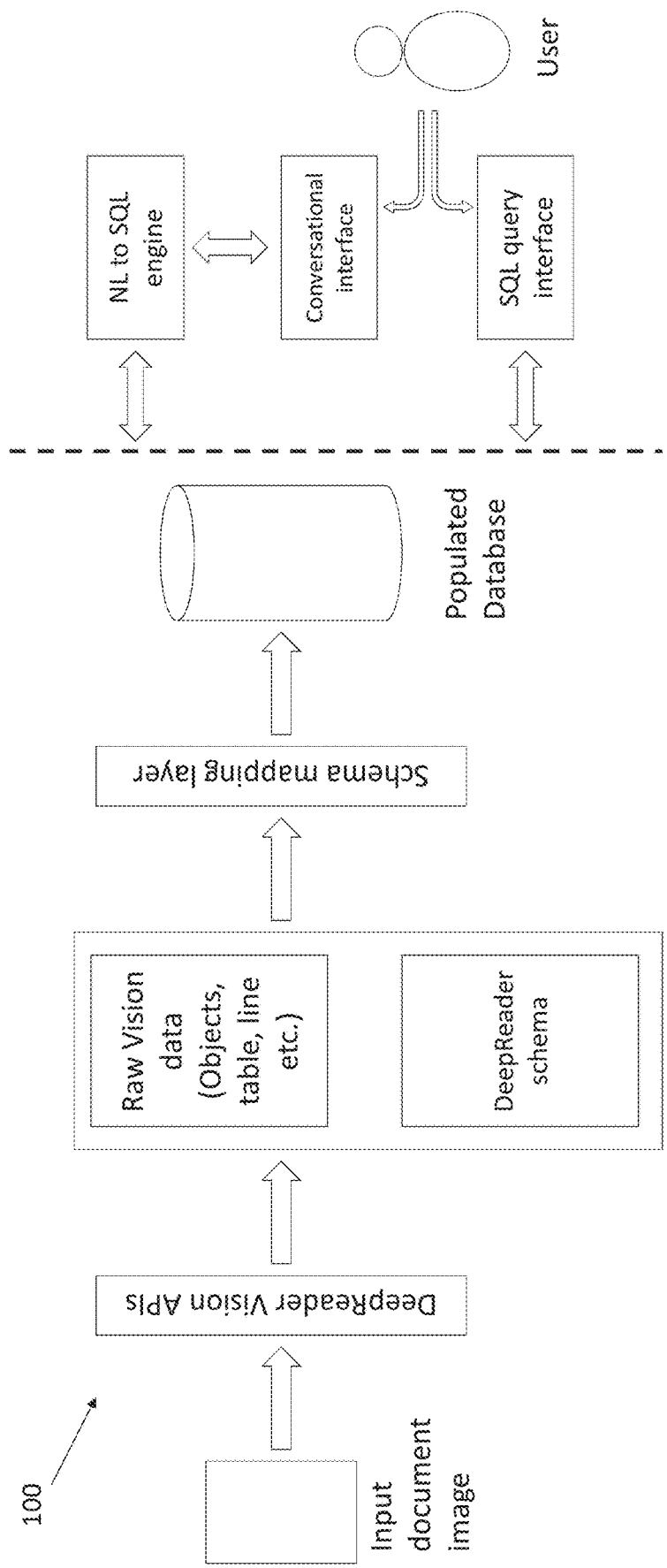
FIG. 2 shows a workflow of the system for writing rules for a query according to an embodiment of the disclosure.

The system 100 is using a framework which may also be referred as "DeepReader framework" A workflow for the DeepReader framework is shown in the FIG. 2. The framework facilitates information extraction from document images via identification of pattern based entities from the documents and maintaining a meta-relational model across different entities in the document image. The model schema allows for an easy to understand abstraction of the entities detected by the deep vision models and the relationships between them. The system 100 works on vision algorithms which are applied to recognize a combination of handwritten and printed text, eliminate noisy effects, identifying the type of documents and detect object/line/box for diagrams. The system 100 further maps the extracted entities into a rich relational schema so as to capture all the relevant relationships between entities (words, textboxes, lines etc.) detected in the document. Relevant information and fields can then be extracted from the document by writing SQL queries on top of the relationship tables. A natural language based interface is also added on top of the relationship schema so that a non-technical user, specifying the queries in natural language, can fetch the information effortlessly.

According to an embodiment of the disclosure, the system 100 further comprises an input module 102, a memory 104 and a processor 106 as shown in the block diagram of FIG. 1. The processor 106 works in communication with the memory 104. The processor 106 further comprises a plurality of modules. The plurality of modules accesses the set of algorithms stored in the memory 104 to perform a certain functions. The processor 106 further comprises a noise removing module 108, a document identifier 110, an optical character recognition (OCR) engine 112, a schema designing module 114, a storing module 116, a conversational interface 118, a conversion module 120 and a database querying module 122.

According to an embodiment of the disclosure the input module 102 is configured to provide the image as an input image to the system 100. The image may be captured from a document or any other source. The input module 102 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite.

The system 100 processes the document in several stages as shown in the work flow of FIG. 2. According to an embodiment of the disclosure, the system 100 comprises the noise removing module 108. The noise removing module 108 is configured to perform a de-noising method on the input image to remove noise from the input image. Normally, a raw document image which may be blurred, noisy or faded which provided as input to the system 100. A noise removing module 108 is employed to clean the image prior to data extraction.

The degradation in quality of images may occur due to various reasons such as camera shake, improper focus, imaging noise, coffee stains, wrinkles, low resolution, poor lighting, or reflections. These kind of problems drastically affect the performance of many computer vision algorithms like text detection, OCR and localization. The objective here is to reconstruct high-quality images directly from noisy inputs and also to preserve the highly structured data in the images. Text document images are markedly different from natural scene images as text documents contain more detailed information and are therefore more sensitive to noise.

The de-noising method is performed by utilizing generative adversarial networks (GANs). The system 100 is using the conditional generative adversarial networks (cGANs) in which both the generator and discriminator are conditioned on extra information y. In the present disclosure, the variable y is represented by a class label i.e., the cleaned image. Only the discriminator have been conditioned by feeding y as an extra input layer. The cGANs network is trained using the following mini-max objective function:

$$\min\max E_x P_r[\log(D(x \quad V \quad y))] + E_{\tilde{x}} P_g[\log \quad 1 - (D(\tilde{x} \ V y))] \quad (1)$$

Figure 3:
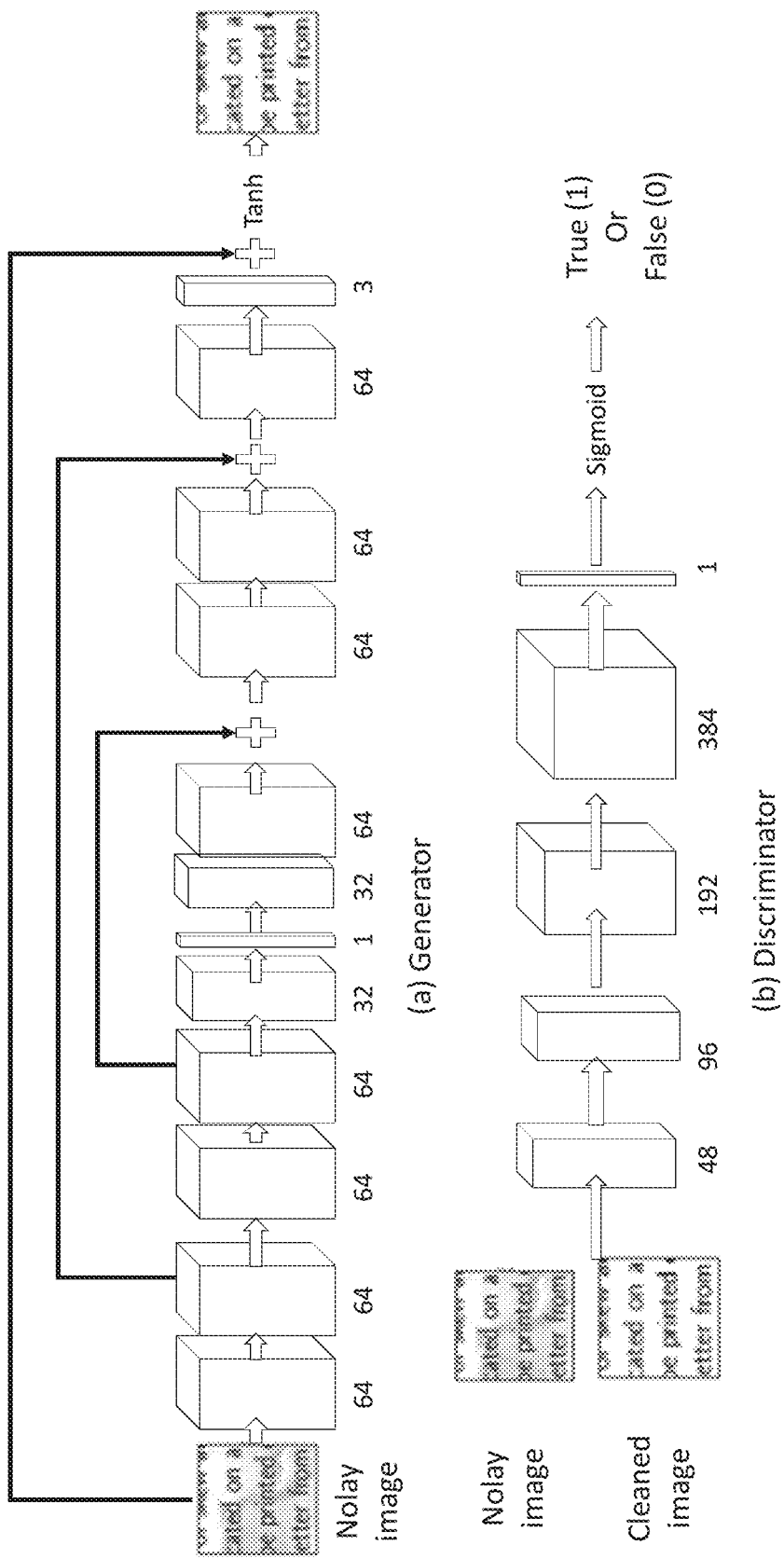
FIG. 3 shows the architecture of cGANs for de-noising images according to an embodiment of the disclosure.
Figure 4:
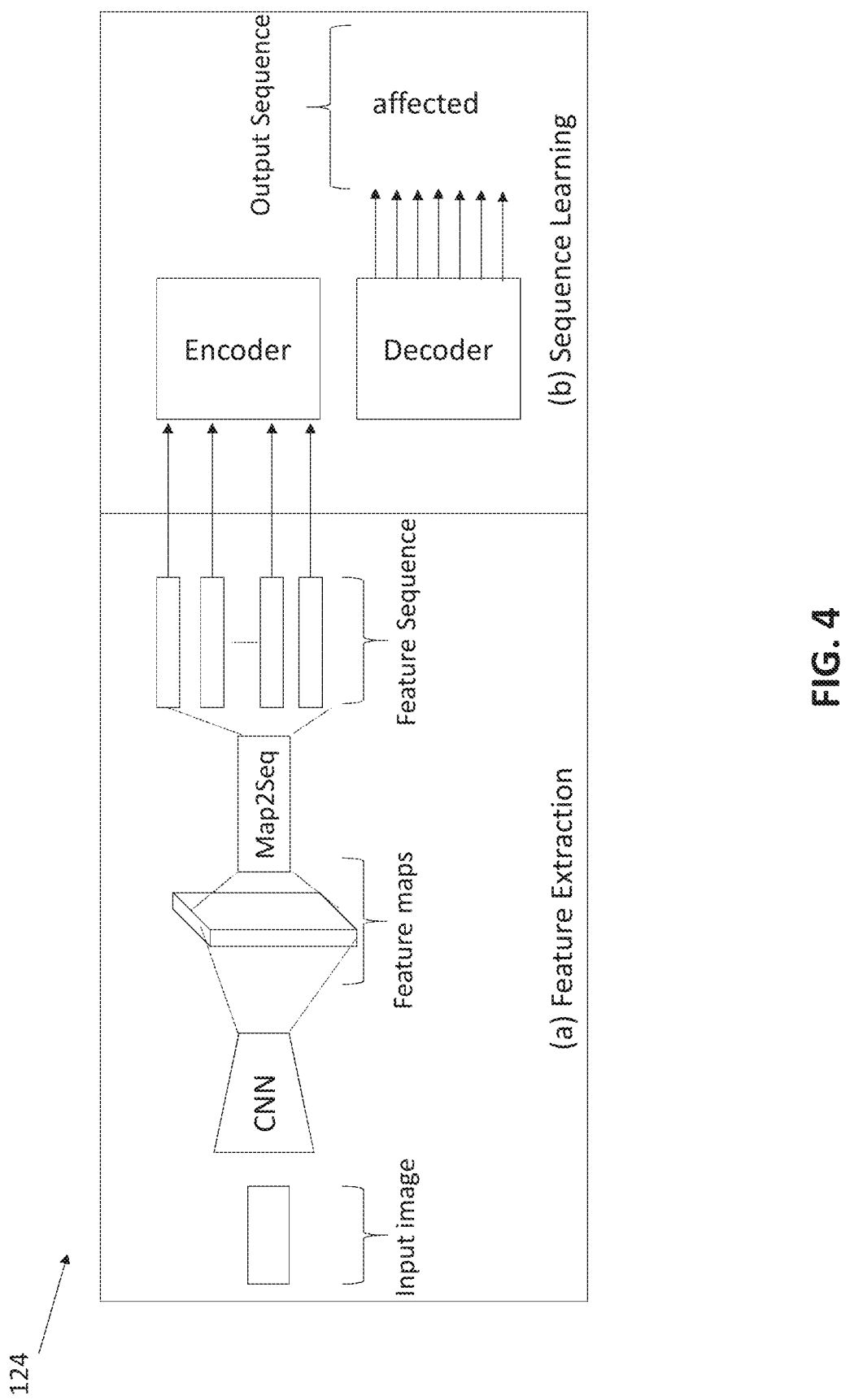
FIG. 4 shows a convolutional neural network with recurrent encoder decoder model according to an embodiment of the disclosure.

Where, $P_r$ is data distribution and $P_g$ is model distribution defined by $\tilde{x}=G(z)$, $z=P(z)$ and z one of the samples from the noisy images dataset The architecture for the cGANs for the de-noising of images is shown in FIG. 3. The figure shows the generator model and the discriminator model. The generator network consists of a combination of convolutional layers and de-convolutional layers (not distinguishable in the figures). Each of the blocks is followed by batch normalization and the activation used in the convolutional layer is PReLU while for de-convolutional layer, ReLU activation is employed. For all the layers, the stride is set to be 1. In order to maintain the dimension of each feature map to be the same as that of the input, zero padding was used where appropriate. For efficient network training and better convergence performance, symmetric skip connections are used as shown in the generator network.

According to an embodiment of the disclosure, the processor 106 further comprises the document identifier 110. The document identifier 110 is configured to identify a type of input image. The type of the input image could be either a printed text or a handwritten text. A deep Siamese network is used for the document identification. The base of the Siamese network consists of a traditional Convolutional Neural Network (CNN).

Depending on the identification of the document identifier 110, if the output is handwritten text then a further processing is required for digitizing the handwritten scanned documents. In the present embodiment, the system 100 is using a handwritten text recognition (HTR) engine 124 which uses a convolutional feature extractor followed by a recurrent encoder-decoder model for mapping the visual features to a set of characters present in the image. A general overview of the model is provided in FIG. 4.

The model involves two steps, i.e., visual feature extraction and sequence learning. The model uses a 7-layered fully convolution network that extracts dense feature maps from the image of a text sequence, word or line. These feature maps are then processed by a specially designed map2seq layer to generate a sequence of feature vectors each of which encode local attributes of individual characters while the complete sequence captures their inter-dependencies and thereby provides a complete visual representation of the text present in the image.

The visual feature sequence is then fed to an encoder RNN that generates a context vector representing the gist of the visual feature sequence. The encoder RNN is composed of bidirectional LSTM cells to capture dependencies along both forward and backward directions. A second decoder LSTM uses this context vector to output a sequence of characters each conditioned on the context vector and the previous output. Layer normalizations were introduced to stabilize the RNN activations and dropouts were added to regularize the model. The encoder-decoder model also uses an Attention mechanism to further augment the decoding capacity in case of long sequences.

The model is trained using focal loss which is an improvement over standard categorical cross-entropy loss as it addresses the class imbalance problem inherent to text recognition. While inference, beam search algorithm is employed which searches for the best possible output sequence over a set of hypotheses by maximizing the joint distribution over all elements of the sequence. The pre-trained models were applied to scanned image of standard documents. Evaluation metrics were, Word Error Rate (WER) & Character Error Rate (CER) The model achieved a WER of 14.2% & a CER of 8.7%.

According to an embodiment of the disclosure, the processor 106 further comprises the optical character recognition (OCR) engine 112. The OCR engine 112 is configured to perform an optical character recognition (OCR) on the input image depending on the type of identified document to detect a set of textual entities. A document has many entities like words, lines, text blocks, and text boxes, check boxes, arrows, OMR circles, logos, tables, figures. The information of interest may involve one or several of these entities, which makes it imperative to detect all of the entities present in the document.

The OCR engine 112 extract the information depending on the type of the text. For page lines, horizontal clustering was performed based on the Euclidean distance between connected component clusters. The page lines were then localized, each page line patch is sent through a standard OCR engine (such as Tesseract, Google Vision or Abby FineReader) to get the text corresponding to that line. It was noticed that sending smaller patches resulted in higher accuracy from the OCR engine.

Similarly, a text block is a set of lines which begin at approximately the same x coordinate and the vertical distance between them is not more than twice the height of the line. The lines that lie inside a particular text-block or box are also identified separately as block or box lines. For the Boxes, first image were eroded followed by the thresholding and inversion. After that the area of each connected component was compared with the area of its bounding box. If the area of the connected component is within a percent of the area of bounding box then connected component is deemed as a box.

According to an embodiment of the disclosure, the processor 106 further comprises the schema designing module 114 and the storing module 116. The schema designing module 114 is configured to design a schema to establish a relation between the set of textual entities. The designed schema is one universal schema for all the documents. Schema of the database does not change. Schema can be used for any kind of document. Further the detected set of textual entities and the schema is stored in a relational database 126 using the storing module 116. The schema is designed to facilitate information extraction. The set of textual entities are associated with their spatial coordinates and this information conveys the whereabouts of the neighboring text entities. This information is then used to infer different logical and spatial relationships.

Once the relational schema is populated with data from the document, it can now be queried like a regular database schema using SQL. According to an embodiment of the disclosure, the processor 106 comprises the database querying module 122. The database querying module 122 is configured to providing the SQL query to the relational database 126 to extract the relevant information from the relational database 126.

According to an embodiment of the disclosure, the system 100 may also be made accessible to the user who are not proficient in the SQL language. The processor 106 also comprises the conversational interface 118 and the conversion module 120. The conversational interface 118 is configured to provide natural language queries to extract relevant information by a user. The natural language query can be provided by any user irrespective of his knowledge about the SQL. The conversion module 120 is configured to convert the natural language queries in to one SQL query. The natural language queries into SQL using sequence to sequence models. DeepReader builds on this work to offer users the conversational interface 118 that maps natural language utterances internally into an SQL query, and extracts the relevant information.

While sometimes a simple SQL query will be sufficient to fetch the required information from the relational database. Many times, a complex query or a sequence of simple queries has to be executed in a pipeline to get the correct information. These complex queries can be broken up into multiple simple queries, storing and building upon the intermediate results. The intermediate result is displayed visually, so that the user can interpret & write better queries further. For this to happen, the intermediate results are saved and fed as a data table into the subsequent query. This way a sequence of queries will get executed and result in a workflow which can be saved and applied on other similar documents in one shot to get the required information. This is explained in more detail in the later part of the disclosure with the help of examples.

According to an embodiment of the disclosure, the system 100 also includes an intent identifier 128. The intent identifier 128 is configured to identify the intention by classifying the natural language query. The user when interacting with the system 100 through natural language, can ask for a variety of different information. The intent identifier 128 is necessary to classify the NL-Query and know the intention. The given NL-utterances is categorized into 3 classes. These are simple extraction queries, creating or saving a workflow & book-keeping. Once the intent is known, the NL-Query is passed to its respective model for further processing.

According to an embodiment of the disclosure, the system 100 is also configured to create a workflow. Simple queries will only fetch information which is easily available from the relational database 126. Often complex queries need to be executed to extract relevant information from the image. Designing complex queries for every possible use case would blow up the SQL-template space and would inhibit query reuse. However, complex queries can be broken down into multiple simple queries, allowing for storing and building upon the intermediate results. Different combinations of simple queries executed in sequence will fetch the complex entity. By default, the output of intermediate result is stored in a temporary table which can be queried further.

According to an embodiment of the disclosure, the system 100 can also maintain the book-keeping. A sequence of meaningful NL-Queries will fetch the required information. This workflow can be applied to a new document with a similar template. Hence storing the workflow to retrieve a particular entity has a lot of value. A simple framework using queues has been built in order to store the recent set of commands in a sequence. Once the user fetches a meaningful information, the workflow is saved. Simple NL-Queries like "clear the workflow", "save the workflow", "apply the workflow on this document" etc. are used for book-keeping.

Figure 5A:
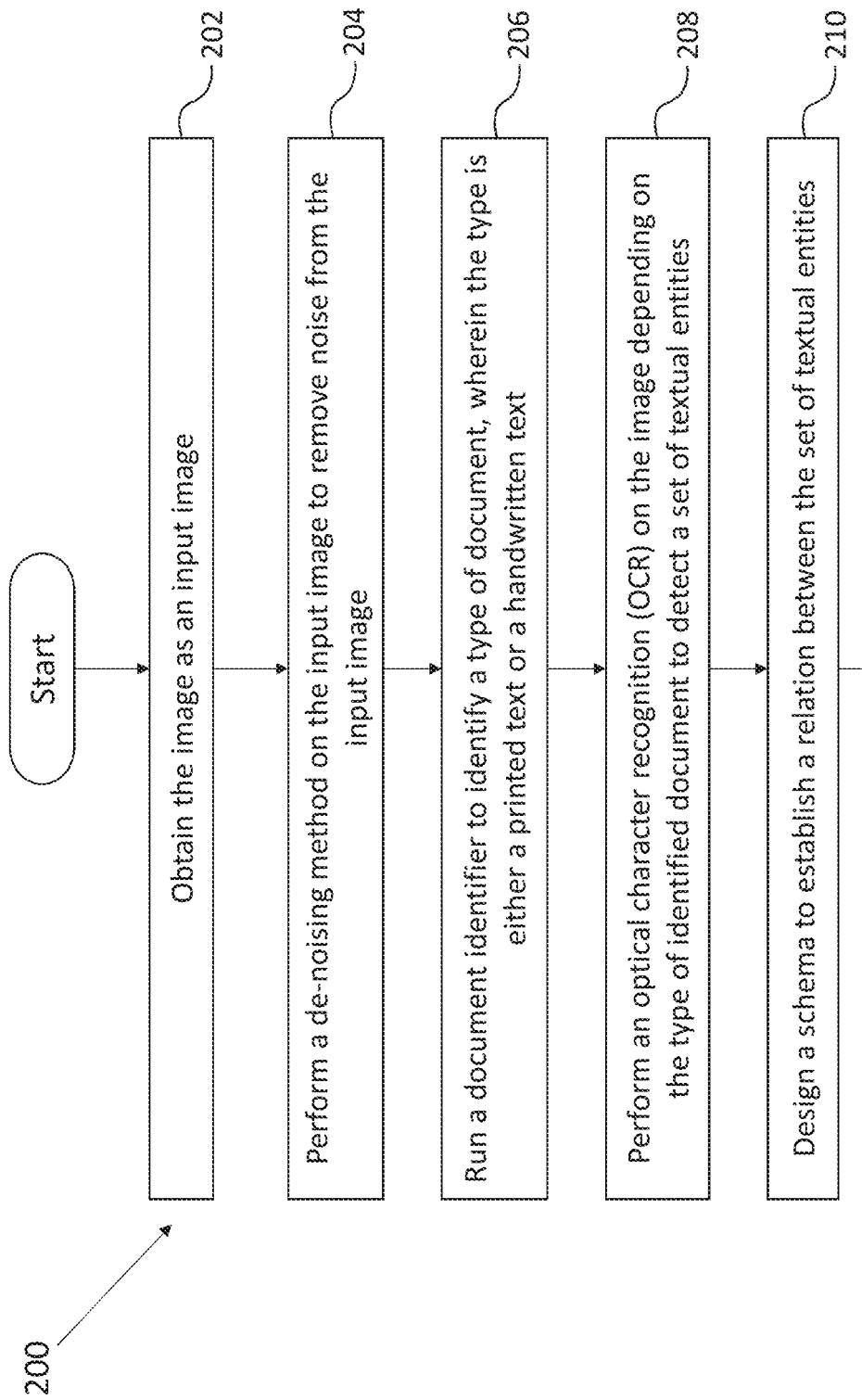
FIGS. 5A and 5B are a flowchart illustrating the steps involved in extracting relevant information from an image using conversational interface and database querying according to an embodiment of the present disclosure.
Figure 5B:
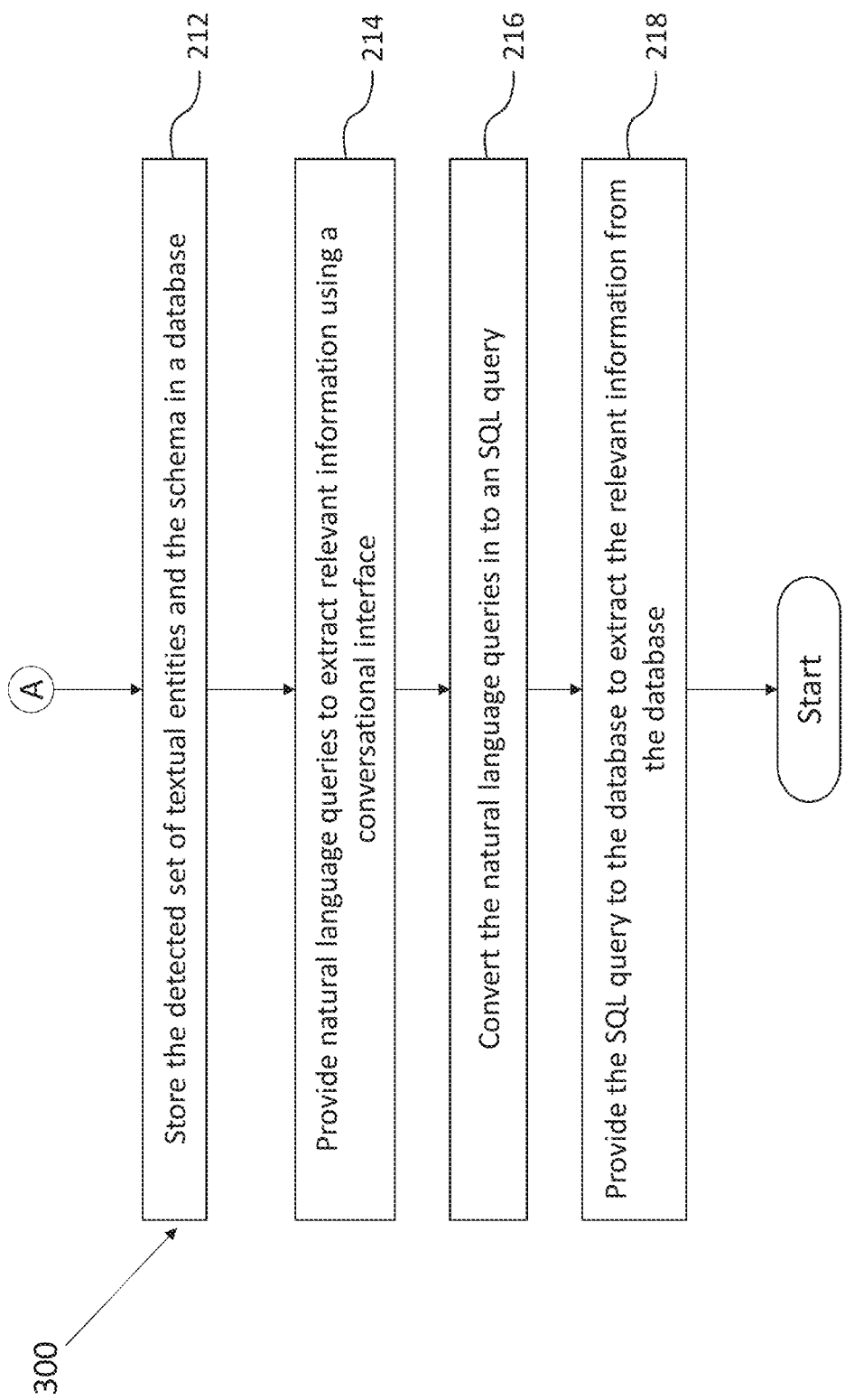

In operation, a flowchart 200 illustrating a method for extracting relevant information from an image is shown in FIG. 5A-5B. Initially at step 202, the image is obtained as the input image. The input image may be obtained from any scanned document. In the next step 204, de-noising is performed on the input image to remove noise from the input image. There could be various reasons due to which image can become noisy. In the next step 206, the document identifier 110 is ran to identify a type of document, wherein the type is either the printed text or the handwritten text. If it is a handwritten text then, the input image is further processed using the HTR engine 124.

In the next step 208, the optical character recognition (OCR) is performed on the image depending on the type of identified document to detect the set of textual entities. The set of textual entities may involve one or more of words, lines, text blocks or text boxes, check boxes, arrows, OMR circles, logos, tables, figures etc. In the next step 210, the schema is designed to establish a relation between the set of textual entities. The schema is designed to facilitate information extraction. The set of textual entities are associated with their spatial coordinates and this information conveys the whereabouts of the neighboring text entities. This information is then used to infer different logical and spatial relationships. Further at step 212, the detected set of textual entities and the schema is stored in the relational database 126.

In the next step 214, natural language queries are provided to extract relevant information using the conversational interface 118 by the user. At step 216, the natural language queries are converted in to one SQL query. And finally at step 218, the SQL query are provided to the relational database 126 to extract the relevant information from the relational database 126. It should be appreciated that in another embodiment the SQL query can directly be provided to the relational database.

According to an embodiment of the disclosure, the system 100 can also be explained with the help examples.

Figure 6:
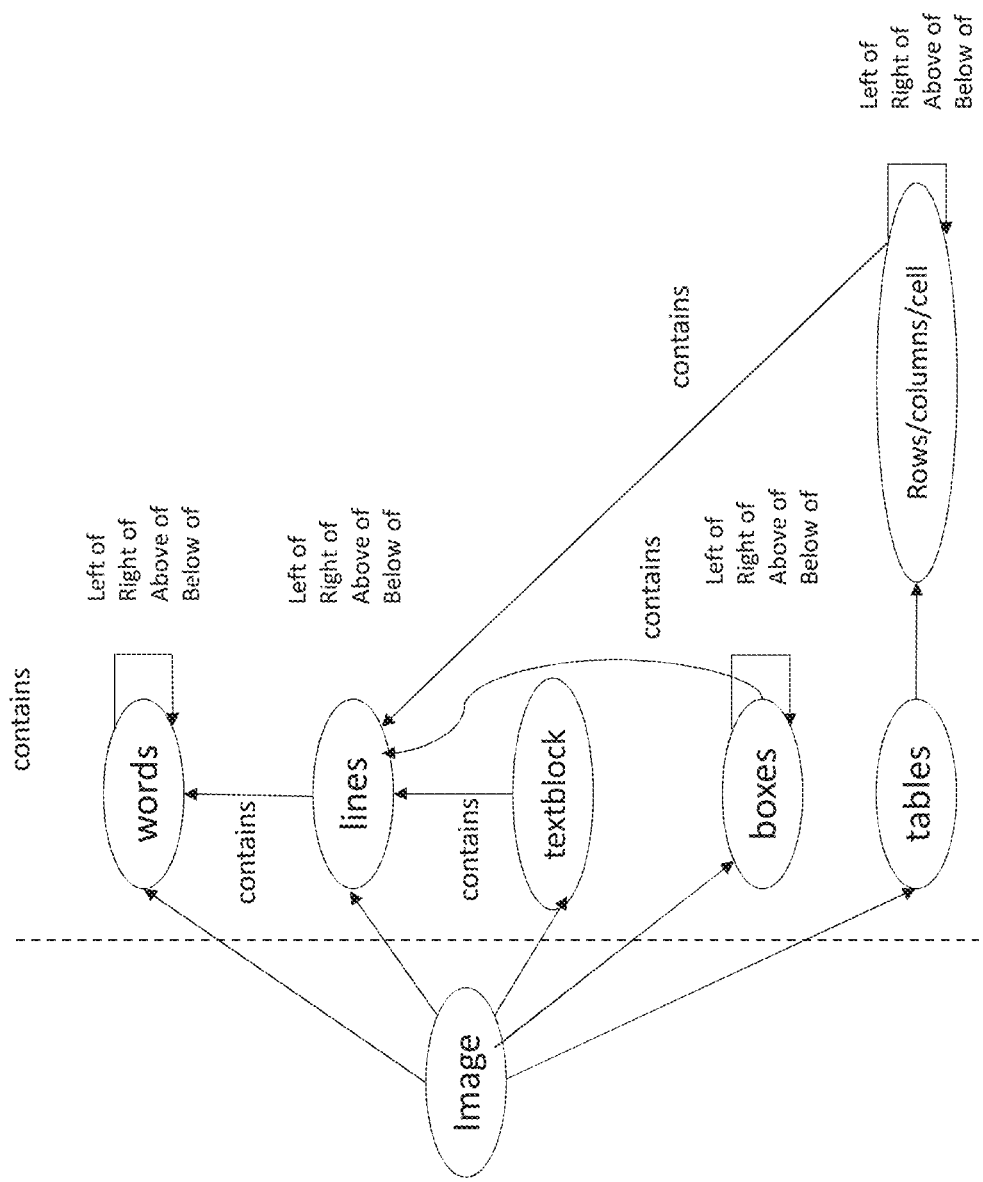
FIG. 6 shows an example of the DeepReader schema according to an embodiment of the disclosure.

FIG. 6 shows an example of the schema populated in the relational database after the relevant relationships have been extracted from the raw image. The main entities of the schema includes words, lines, text blocks, boxes and tables. Inter and intra entity relationships have been illustrated by the directions of the arrow. The schema may get richer over time, the figure highlights the entities that are useful for scanned document images at the moment.

The line entities identified from the vision components includes information about the line text, individual words in the line along with the line and word coordinates. Using the coordinate position of words, DeepReader extracts words to the left/right/above/below of other words and maintains it in the schema. Similarly it uses the raw vision data to maintain the words and the lines in which they occur in the schema as a separate table. As shown in the FIG. 7, the word 'SREEPUR' will be detected by the vision components along with the associated coordinates. The word to the left is 'GILARCHALA', right is 'null', above is 'COMPOSITE' and below is 'BANGLADESH'. In this way deep reader maintains the relative spatial position of each word/line/ block etc. The text block entities identified includes attributes in a similar fashion. The line id, word id, word text, line text of every word and line in the text block, along with coordinates for each word and line as well as the text of the individual lines identified in the block is populated in the database. Additional relationships such as lines below/above a word in the text block are also maintained. For example 'DRAWEE' can be extracted from the document using the line below word relationship. The line below the word DRAWEE in the text block is 'ABCD PRIVATE LIMITED'.

It has been observed that most of the documents such as bank receipts, invoices, etc. in the real world have certain universal patterns that occur which may be utilized for extraction. For example, colon separated values which define a key value pair. This background knowledge has been used to extract the key value pair relationship directly. As shown in FIG. 7 "SWIFT: XABCLUS33" is an example of a key value pair. Using the key SWIFT its value can be directly fetched by querying on this relationship table.

The intent identifier can be classified with the help of following example. Once the intent identifier classifies the given NL-Query as simple query, the NL-Query is sent to this model for further processing. A typical SQL-Query is structured as follows:

SELECT $SELECT COL FROM $TABLE

WHERE $COND COL $OP $COND VAL

Therefore to map an NL utterance to an SQL query following steps were performed:

Entity Recognition: $COND_VAL as shown above is an entity which is document specific and the same has to be extracted from the NL sentence. This corresponds to the Named Entity Recognition (NER) problem and here Conditional Random Fields (CRFs) were utilized to solve this problem extract. Each word in the NL-query is tagged as either an entity or a non-entity and a CRF is trained on this encoding. Once the $COND VAL were obtained, using the CRF, the same was replaced with a standard word in the dictionary. For example, 'SWIFT' will be identified as an entity by CRFs in the sentence "Please get me the word towards right of SWIFT" and will be replaced with "Please get me the word towards right of <COND VAL>". This will help in processing the NL-query by subsequent models in the pipeline.

Template Mapping: A template-based approach was employed to the generation of SQL-Queries and formulate it as a slot filling problem. All simple NL-queries will be mapped to one of the templates in the template pool. Further, this was formulated as a classification problem with the modified NL-Query being classified by a deep sequential model. Below are a few sample SQL templates used:

SELECT*FROM TABLE

WHERE id=(SELECT id FROM TABLE WHERE string="VALUE")

SELECT*FROM TABLE WHERE primary str="VALUE"

SELECT SUBSTR(line, pos(VALUE),) FROM TEMP

SELECT SUBSTR(line, pos(VALUE1), pos (VALUE2)-pos(VALUE1)) FROM TEMP

Table Mapping: Once the correct template is identified, slots for TABLE and VALUE are required to be filled. The VALUE is readily obtained from the Entity Recognition model. The NL-Query has a many linguistic variants words which can map to the relevant table. For example, the sentences "get me the word towards the right of SWIFT" and "get me the word immediately next to SWIFT" will map to the same table "rightof". This mapping is done using an LSTM model trained to classify on these variations.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein solves the difficulty of non-technical users to efficiently utilize the system for efficient data extraction from images. The disclosure provides a method and system for extraction of relevant information from the images using a conversational interface and database querying.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method (200) for extracting relevant information from an image, the method comprising a processor implemented steps of:
    obtaining the image as an input image (202);
    performing a de-noising method on the input image to remove noise from the input image (204), wherein the de-noising method is performed by utilizing conditional generative adversarial networks (cGANs);
    running a document identifier to identify a type of document, wherein the type is either a printed text or a handwritten text (206);
    performing an optical character recognition (OCR) on the image depending on the type of identified document to detect a set of textual entities (208);
    designing a schema to establish a relation between the set of textual entities (210);
    storing the detected set of textual entities and the schema in a relational database (212);
    providing natural language queries by a user to extract relevant information using a conversational interface (214);
    converting the natural language queries into an SQL query (216); and
    providing the SQL query to the relational database to extract the relevant information from the relational database (218).

2. The method of claim 1 further comprising the step of directly providing the SQL query to the relational database after storing the detected set of textual entities and the schema in the relational database.

3. The method of claim 1 further comprising the step of processing the handwritten text using a recurrent encoder-decoder model for mapping the visual features to a set of characters present in the input image.

4. The method of claim 1 further comprising the step of classifying the natural language query and their intentions.

5. The method of claim 1 further comprising the step of storing a workflow of a set of SQL queries which were used to extract the relevant information.

6. The method of claim 1 wherein the set of textual entities are associated with their spatial coordinates and this information conveys the whereabouts of the neighboring textual entities.

7. The method of claim 1 wherein the document identifier is run using a Siamese network consisting of a convolutional neural network (CNN).

8. The method of claim 1, wherein the set of textual entities are one or more of words, lines, text blocks, check boxes, arrows, OMR circles, logos, tables, figures or text boxes.

9. The method of claim 1, wherein the document identifier is run to ascertain a correct template before performing OCR.

10. The method of claim 1, wherein the noise in the input image is due to one or more of camera shake, improper focus, imaging noise, coffee stains, wrinkles, low resolution, poor lighting, or reflections.

11. The method of claim 1 further comprising the step of breaking up the initial SQL queries into more than one simpler queries as compared to initial query.

12. A system (100) for extracting relevant information from an image, the system comprises:
    an input module (102) for providing the image as an input image;
    a memory (104); and
    a processor (106) in communication with the memory, the processor further comprises:
        a noise removing module (108) for performing a de-noising method on the input image to remove noise from the input image, wherein the de-noising method is performed by utilizing conditional generative adversarial networks (cGANs);
        a document identifier (110) to identify a type of document, wherein the type is either a printed text or a handwritten text;
        an OCR engine (112) to perform an optical character recognition (OCR) on the image depending on the type of identified document to detect a set of textual entities;
        a schema designing module (114) to design a schema to establish a relation between the set of textual entities;
        a storing module (116) to store the detected set of textual entities and the schema in a relational database;
        a conversational interface (118) to provide natural language queries to extract relevant information by a user;
        a conversion module (120) to convert the natural language queries into an SQL query; and a database querying module (122) to provide the SQL query to the relational database to extract the relevant information from the relational database.

13. A computer program product comprising a non-transitory computer readable medium having a computer readable program embodied therein, wherein the computer readable program, when executed on a computing device, causes the computing device to:

obtain an image as an input image (202);

perform a de-noising method on the input image to remove noise from the input image (204), wherein the de-noising method is performed by utilizing conditional generative adversarial networks (cGANs);

run a document identifier to identify a type of document, wherein the type is either a printed text or a handwritten text (206);

perform an optical character recognition (OCR) on the image depending on the type of identified document to detect a set of textual entities (208);

design a schema to establish a relation between the set of textual entities (210);

store the detected set of textual entities and the schema in a relational database (212);

provide natural language queries by a user to extract relevant information using a conversational interface (214);

convert the natural language queries into an SQL query (216); and provide the SQL query to the relational database to extract the relevant information from the relational database (218).

14. The computer program product of claim 13, further comprising the step of directly providing the SQL query to the relational database after storing the detected set of textual entities and the schema in the relational database.

* * * * *